United States Patent [19]
Lin et al.

[11] Patent Number: 5,618,328
[45] Date of Patent: Apr. 8, 1997

[54] SPINNER FOR MANUFACTURING DUAL-COMPONENT FIBERS

[75] Inventors: David C. K. Lin, Worthington; Ronald A. Houpt, Newark; Patrick M. Gavin, Newark; Richard D. Lawson, Newark; Jay W. Hinze, Newark, all of Ohio

[73] Assignee: Owens Corning Fiberglass Technology, Inc., Summit, Ill.

[21] Appl. No.: 591,193

[22] Filed: Jan. 11, 1996

Related U.S. Application Data

[63] Continuation of Ser. No. 236,063, May 2, 1994, abandoned, which is a continuation-in-part of Ser. No. 147,762, Nov. 5, 1993, abandoned.

[51] Int. Cl.$^6$ ..................................... C03B 37/04
[52] U.S. Cl. ..................... 65/502; 65/504; 65/521; 264/211.1; 264/DIG. 26; 264/DIG. 29; 264/168
[58] Field of Search ...................... 65/502, 504, 516, 65/521, 438, 459, 470; 264/211.1, DIG. 26, DIG. 29, 168, 174

[56] References Cited

U.S. PATENT DOCUMENTS

| | | |
|---|---|---|
| 2,927,621 | 8/1956 | Slayter et al. . |
| 2,998,620 | 6/1958 | Stalego . |
| 3,073,005 | 12/1957 | Tiede . |
| 3,176,346 | 6/1962 | Brazelton . |
| 4,622,054 | 11/1986 | Huey et al. . |

*Primary Examiner*—John Hoffmann
*Attorney, Agent, or Firm*—Curtis B. Brueske; C. Micheal Gegenheimer

[57] ABSTRACT

Apparatus for making dual component fibers is provided and includes a spinner having a peripheral wall. The spinner includes orifices located on the peripheral wall thereof for centrifuging the dual component fibers, with the spinner being divided into a series of generally vertically-aligned compartments by baffles positioned circumferentially around the interior of the peripheral wall. First and second molten thermoplastic materials are supplied to the spinner and directed into alternate ones of the compartments so that adjacent compartments contain different thermoplastic materials. Passages are located in each of the compartments through which the respective molten thermoplastic materials flow to the orifices on the peripheral wall of the spinner. The passages in adjacent ones of the compartments communicate with one another and with the orifices to join the first and second molten thermoplastic materials together into dual component fibers.

19 Claims, 5 Drawing Sheets

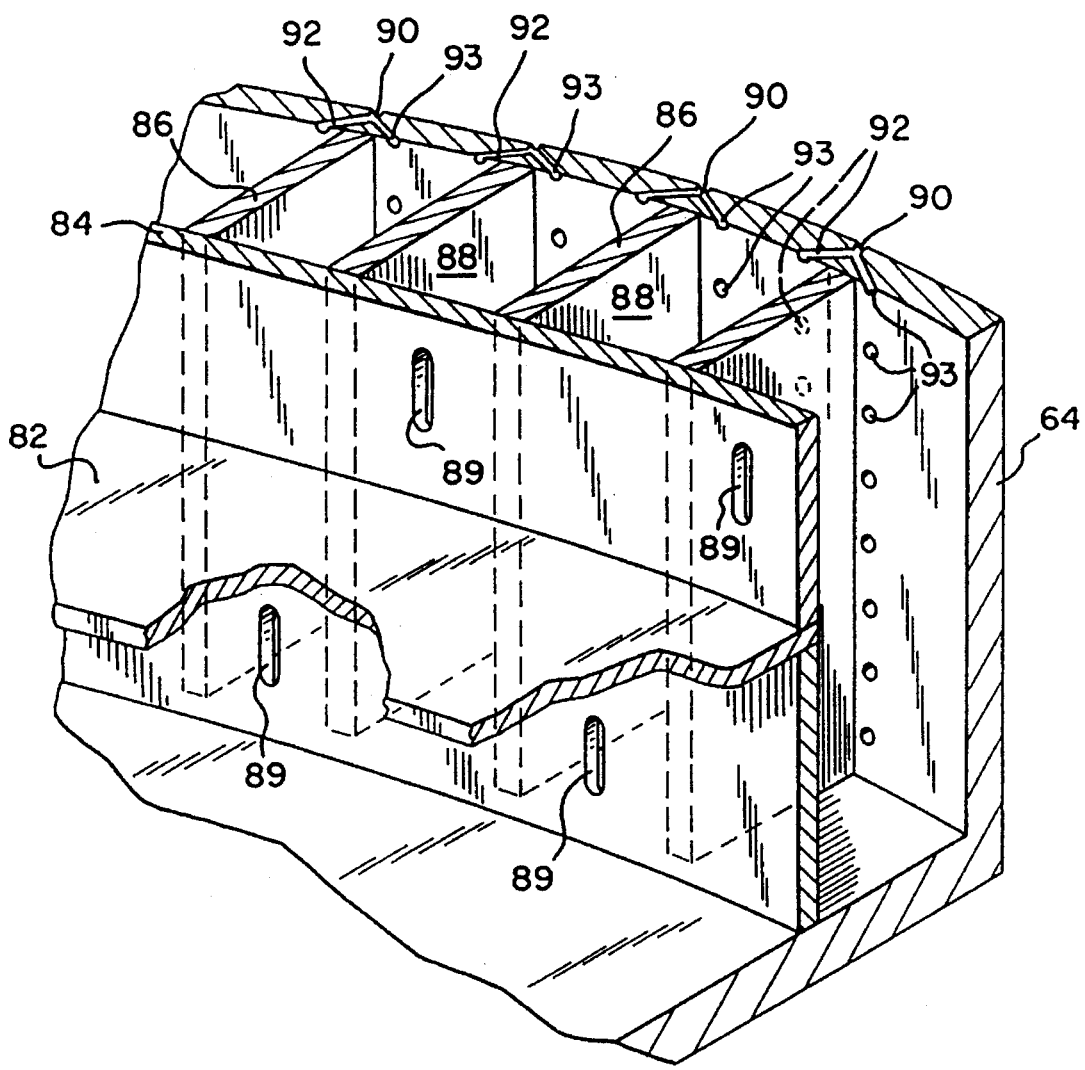

SPINNER FOR MANUFACTURING DUAL-COMPONENT FIBERS

CROSS-REFERENCE TO RELATED APPLICATION

This application is a continuation of U.S. patent application Ser. No. 08/236,063, filed May 2, 1994, now abandoned, which was entitled SPINNER FOR MANUFACTURING DUAL-COMPONENT FIBERS, which was a continuation-in-part of U.S. patent application Ser. No. 08/147,762, filed Nov. 5, 1993, and entitled APPARATUS FOR MAKING DUAL-GLASS FIBERS, now abandoned.

BACKGROUND OF THE INVENTION

This invention relates to an apparatus for manufacturing dual component fibers from thermoplastic materials, and more particularly to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

A modification of conventional glass fibers, which are usually straight fibers, is the use of fibers which are curly (helical) in shape. These fibers can be made by joining two distinct glass streams, commonly referred to as the A glass and B glass streams, and centrifuging the dual glass stream into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a dual glass stream.

However, there remains a need in this art for improving the delivery of dual streams of molten glasses to form dual glass or other thermoplastic fibers.

SUMMARY OF THE INVENTION

This need is met by the present invention in which a series of orifices are positioned in the spinner peripheral wall which are fed with different molten thermoplastic materials by passages from adjacent compartments to form dual component fibers. For purposes of this patent specification, in using the terms "glass fibers" and "glass compositions", "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers.

In accordance with one aspect of the present invention, an apparatus for making dual component fibers is provided and includes a spinner having a peripheral wall. The spinner includes orifices located on the peripheral wall thereof for centrifuging the dual component fibers, with the spinner being divided into a series of generally vertically-aligned compartments by baffles positioned circumferentially around the interior of the peripheral wall.

The first and second molten thermoplastic materials are supplied to the spinner by any suitable equipment. For example, if the materials are glasses, the equipment will include melting furnaces and forehearths to supply the two molten glasses. A divider is provided in the spinner for directing the first molten thermoplastic material into alternate ones of the compartments and for directing the second molten thermoplastic material into the remaining ones of the compartments so that adjacent compartments contain different thermoplastic materials.

Passages are located in each of the compartments through which the respective molten thermoplastic materials flow to the orifices on the peripheral wall of the spinner. The passages in adjacent ones of the compartments communicate with one another and with the orifices to join the first and second molten thermoplastic materials together into dual component fibers.

In a preferred form, adjacent ones of the passages in adjacent compartments join together in either a V- or Y-shape. Preferably, those passages in adjacent compartments converge at an angle of from about 20 to 45 from normal to the spinner peripheral wall. The passages are sized to provide a build up of molten thermoplastic materials in the compartments. The passages in the adjacent compartments are preferably of substantially the same diameter and length so that substantially equal proportions of the two molten thermoplastic materials are provided to the orifices. However, it should be appreciated that the diameter and length of the passages may be controlled to vary the ratios of the two molten thermoplastic materials.

The divider in the spinner includes a generally horizontal flange positioned intermediate the spinner peripheral wall. The divider preferably further includes a generally vertical interior wall, with the interior wall including a series of orifices therein spaced to provide access for the first molten thermoplastic material into alternate ones of the compartments and to provide access for the second molten thermoplastic material into the remaining ones of the compartments.

In a preferred embodiment of the invention, the thermoplastic materials are glasses, and the spinner is adapted to receive two separate molten glass streams for fiberization into dual glass fibers.

Accordingly, it is a feature of the present invention to provide a series of orifices positioned in a spinner peripheral wall which are fed with different molten thermoplastic materials by passages from adjacent compartments to form dual component fibers. This, and other features and advantages of the present invention will become apparent from the following detailed description, the accompanying drawings, and the appended claims.

BRIEF DESCRIPTION OF THE DRAWINGS

FIG. 7 is a perspective view taken from the interior of the spinner showing the divider and compartments for the A and B components.

DETAILED DESCRIPTION OF THE PREFERRED EMBODIMENTS

The invention will be described in terms of apparatus for making irregularly-shaped dual glass fibers, although it is to be understood that the invention encompasses apparatus for making not only other types of dual glass fibers such as curly (helical) fibers, but also dual component fibers of other thermoplastic materials such as polyester or polypropylene.

Figure 1:
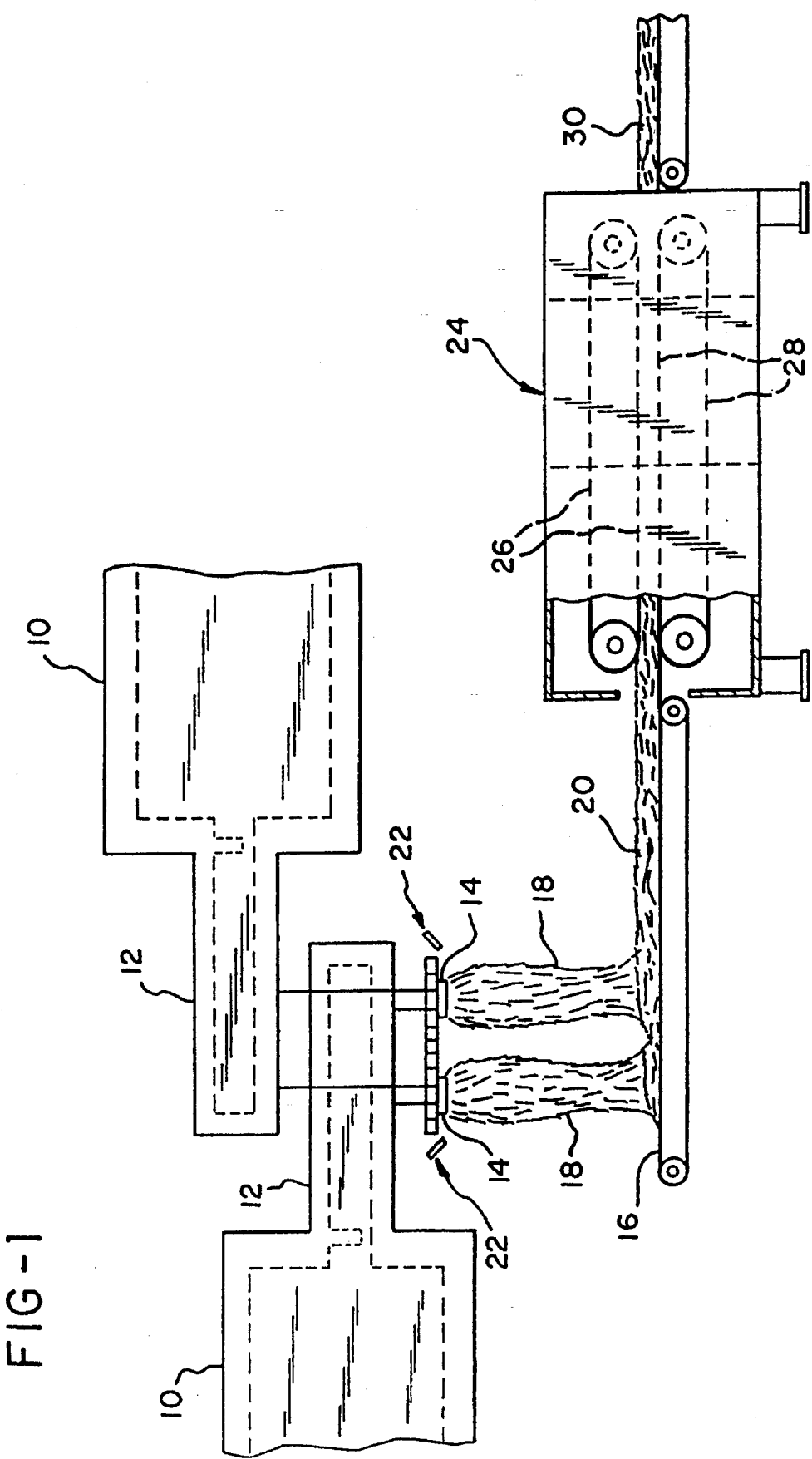
FIG. 1 is a schematic view in elevation of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of dual glass fibers, such as irregularly-shaped glass fibers produced by the fiberizers, are collected on conveyor 16 as wool pack 20 by means of a vacuum positioned beneath the conveyor (not shown). As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700 to 1000F (371 to 593C). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 10 minutes, the wool pack then exits oven 24 as insulation product 30.

It is to be understood that heat setting is an optional aspect of the present invention. Alternatively, the wool pack may be encapsulated with an exterior plastic layer as taught by Schelhorn et at, U.S. Pat. No. 5,277,955, the disclosure of which is hereby incorporated by reference. Further, the wool pack may be subjected to other fabrication techniques including stitching, needling, or hydro-entanglement.

Figure 2:
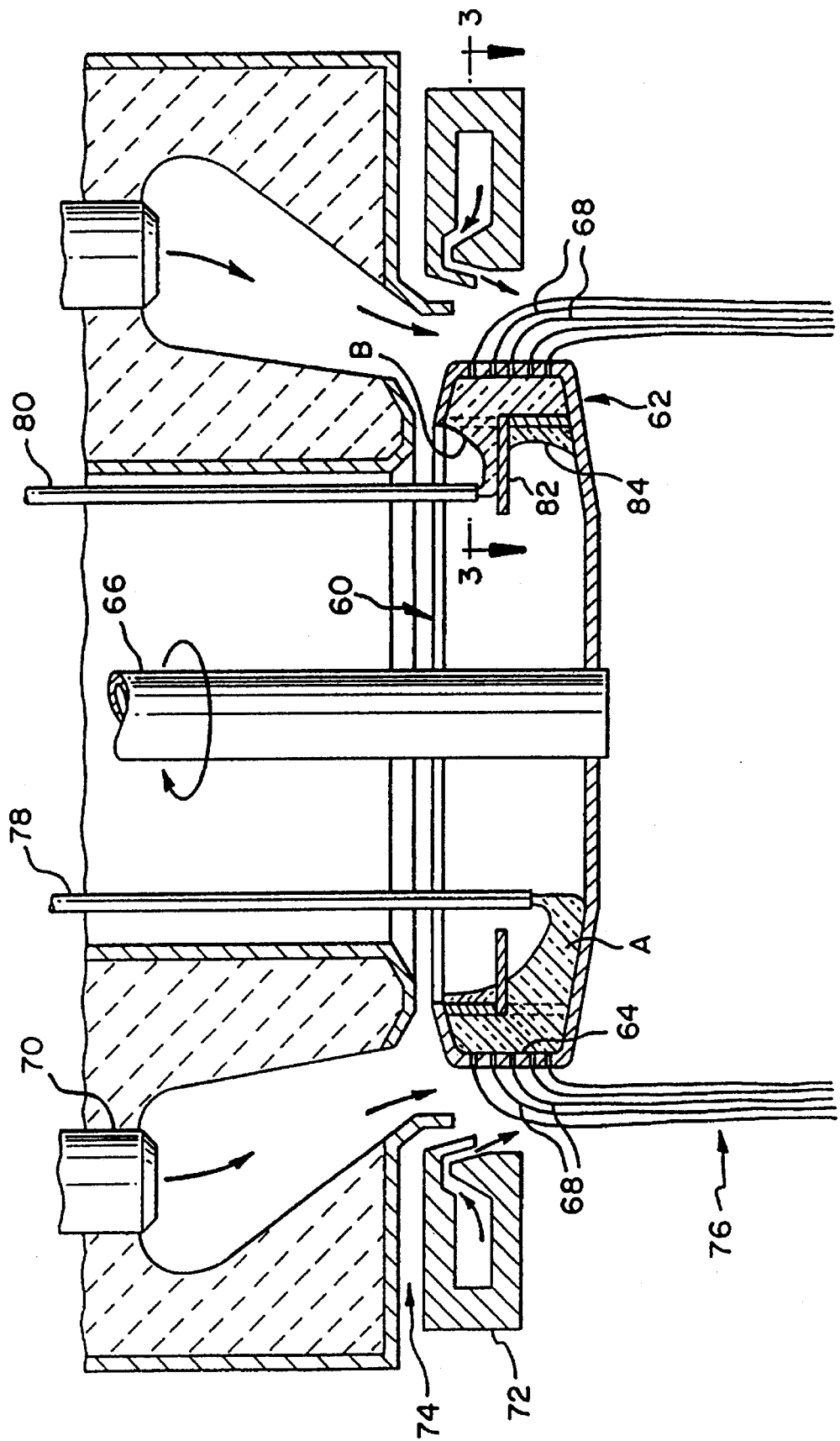
FIG. 2 is a cross-sectional view in elevation of the fiberizer/spinner used in the practice of the invention.

As shown in FIG. 2, spinner 60 includes a spinner peripheral wall 64 and a spinner bottom wall 62. The spinner is rotated on spindle 66, as is known in the art. The rotation of the spinner centrifuges molten glass through orifices in spinner peripheral wall 64 to form primary fibers 68. The primary fibers 68 are maintained in a soft, attenuable condition by the heat of annular burner 70. An internal burner (not shown) may also be used to provide heat to the interior of spinner 60. Annular blower 72, using induced air through passage 74, is positioned to pull primary fibers 68 and further attenuate them into secondary dual-glass fibers 76, suitable for use in wool insulating materials. The dual-glass irregularly-shaped glass fibers are then collected on a conveyor (as shown in FIG. 1) for formation into a wool pack.

The interior of spinner 60 is supplied with two separate streams of molten glass, first stream 78 containing glass A and second stream 80 containing glass B. The glass in stream 78 drops directly onto spinner bottom wall 62 and flows outwardly due to the centrifugal force toward spinner peripheral wall 64 to form a head of glass A as shown. Glass B in molten glass stream 80 is positioned closer to spinner peripheral wall 64 than stream 78, and the B glass in stream 80 is intercepted by horizontal flange 82 before it can reach the spinner bottom wall. Thus, a build-up or head of glass B is formed above horizontal flange 82 as shown.

Figure 3:
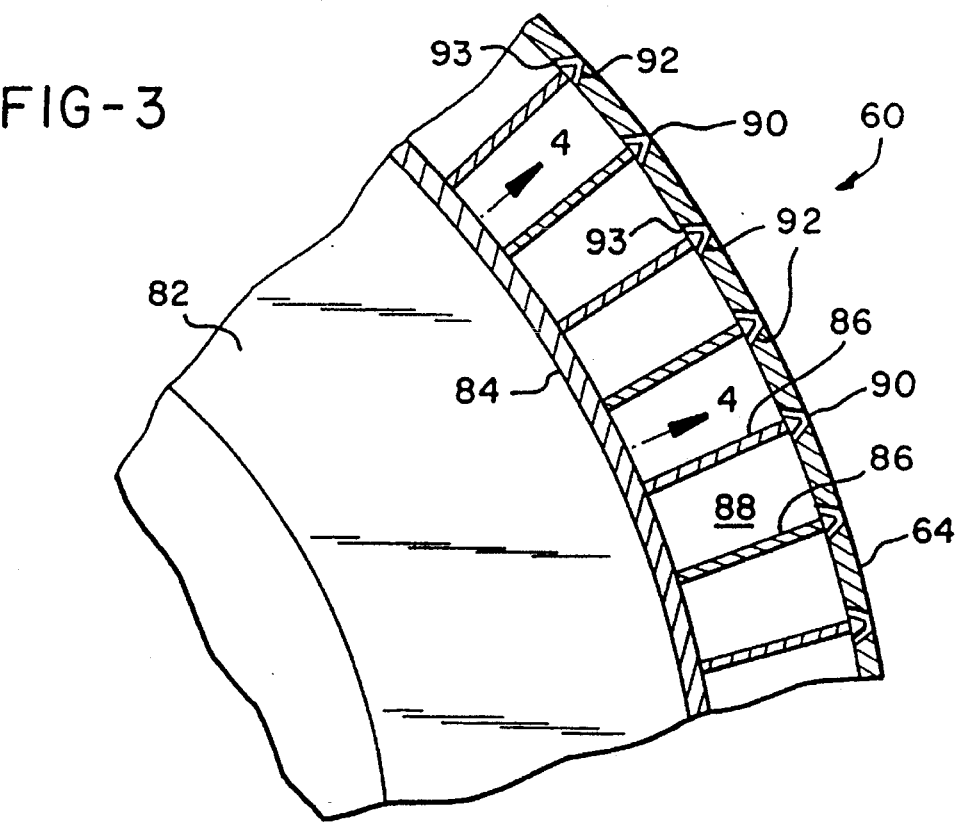
FIG. 3 is a plan view, partly in section, of a portion of the spinner taken along line 3—3 of FIG. 2.

As best shown in FIGS. 3 and 7, the spinner 60 is adapted with a vertical interior wall 84 which is generally circumferential and positioned radially inwardly from the spinner peripheral wall 64. A series of vertical baffles 86, positioned between spinner peripheral wall 64 and vertical interior wall 84, divide that space into a series of generally vertically-aligned compartments 88 which runs substantially the entire height of spinner peripheral wall 64. Alternate compartments contain glass A and glass B which flow, respectively, into compartments 88 through slots 89 in interior wall 84. It can be seen that horizontal flange 82, vertical interior wall 84, and baffles 86 together comprise a divider for directing glasses A and B into alternating adjacent compartments 88 so that every other compartment contains glass A while the remaining compartments contain glass B.

Figure 4:
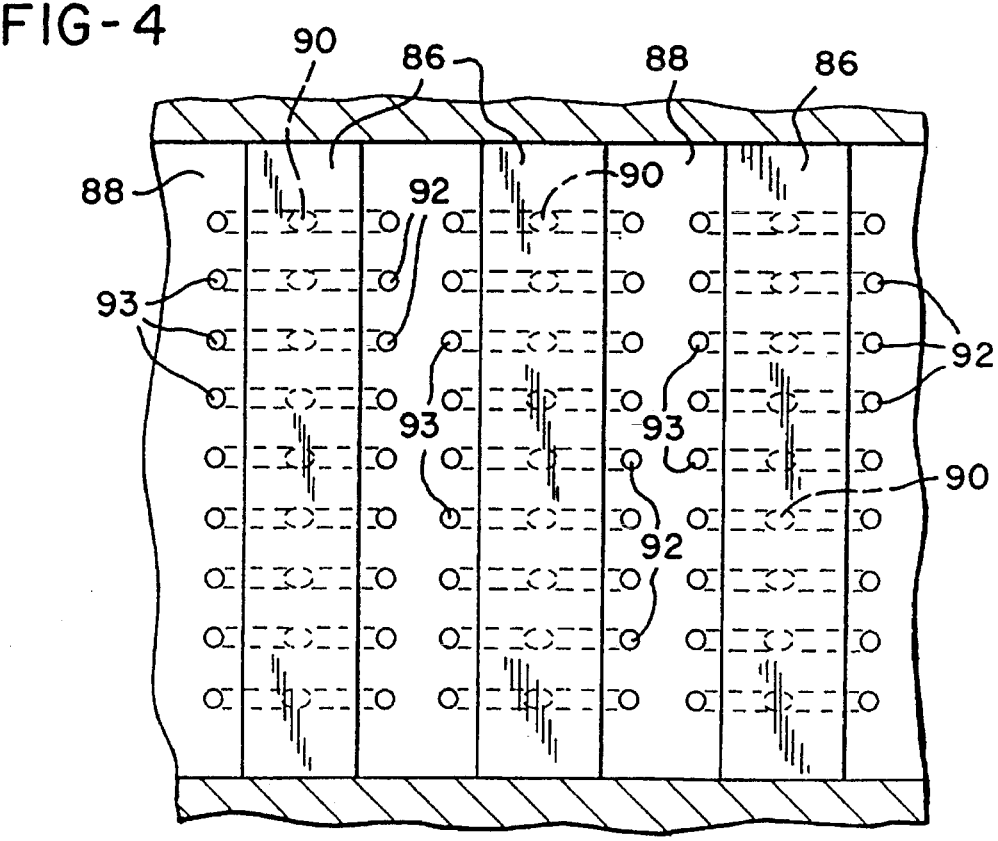
FIG. 4 is a schematic partial view, taken in elevation, of the spinner taken along line 4—4 of FIG. 3.

Spinner peripheral wall 64 has orifices 90 located thereon. Orifices 90 are positioned adjacent to, and in general alignment with, the radial outward edges of the vertical baffles 86. As can been seen in FIGS. 4 and 7, a series of passages or bores 92 and 93 are located in each of the compartments 88 through which molten thermoplastic material will flow. Preferably, these passages are located adjacent either side of baffes 86 and are angled to communicate one another and with orifices 90 on the outer surface of peripheral wall 64.

As shown the passages 92 and 93 are generally vertically aligned and are preferably sized to provide equal flow lengths for the A and B glass components in adjacent compartments 88. This ensures that when the A and B components exit orifices 90 in side-by-side relation, there will be approximately equal mounts of A and B glasses for each fiber. It will be recognized that if unequal mounts of A and B glasses are desired, the passages 92 and 93 may be sized to provide for unequal anounts of flow resulting in unequal proportions in the dual component fiber. Such a result may be desirable in certain instances. Additionally, the passages in each compartment may vary in size to provide a variation in the ratios of A and B glasses in the dual component fibers formed.

Typically, passages 92 and 93 will have diameters in the range of from about 0.010 to about 0.040 inches (0.25 to about 1.0 mm), and preferably from about 0.015 to about 0.025 inches (0.38 to about 0.63 mm). The number of passages formed depends on the height of the spinner peripheral wall. The number and size of the passages, as well as the flow rate of the molten glasses into compartments 88 is chosen to build up a "head" of molten material covering the passages in each compartment.

Figure 5:
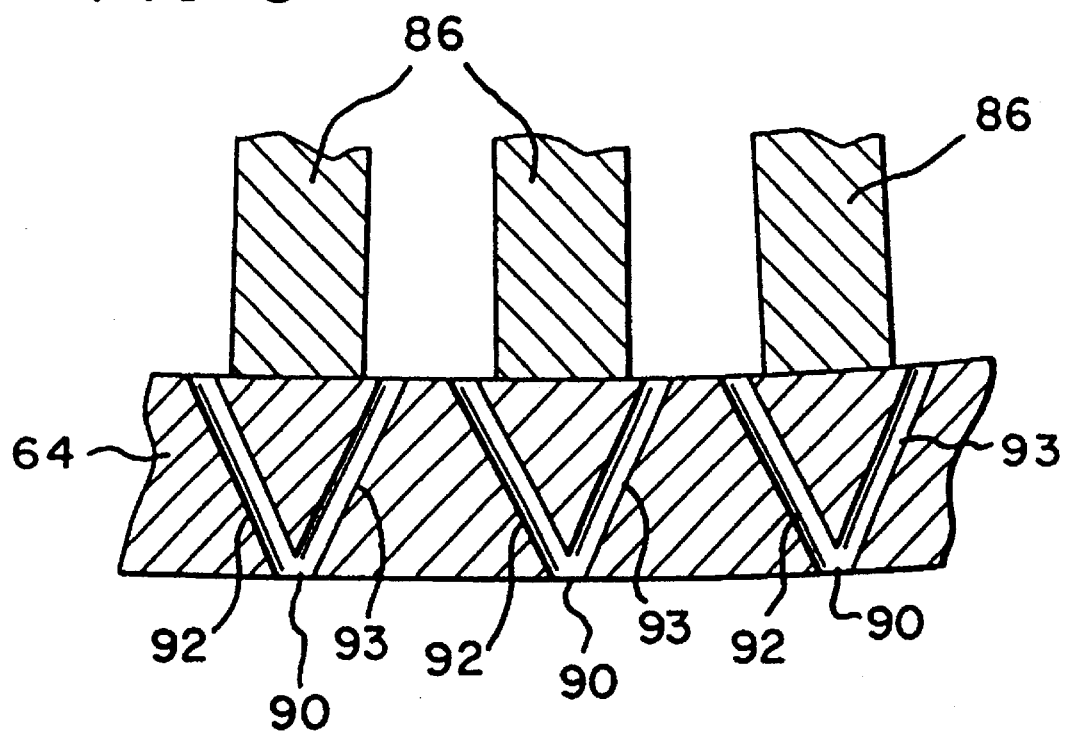
FIG. 5 is a partial cross-sectional view of a V-hole embodiment of the orifices in the spinner.
Figure 6:
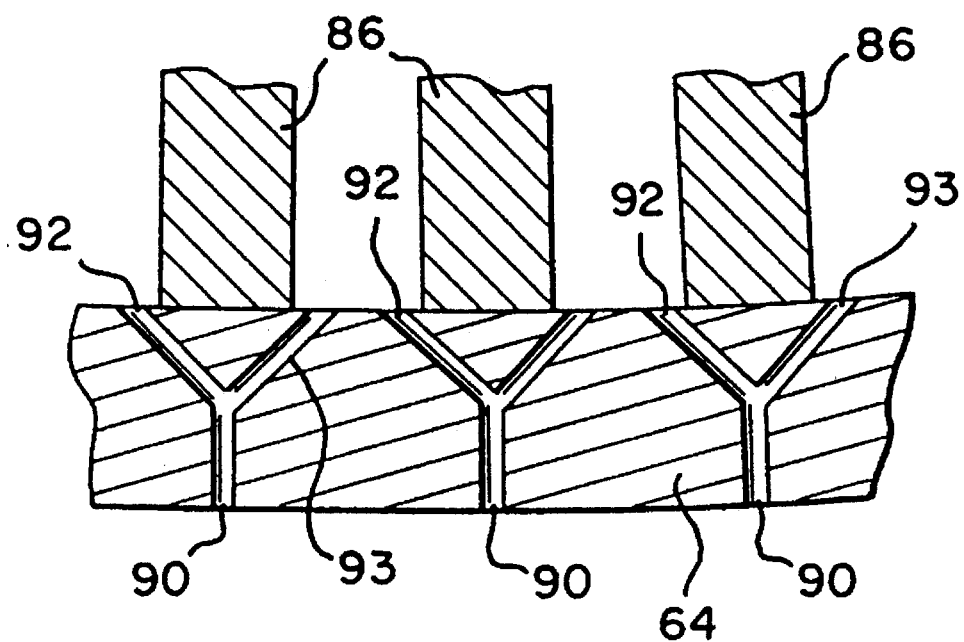
FIG. 6 is a partial cross-sectional view of a Y-hole embodiment of the orifices in the spinner.

Orifices 90, and passages or bores 92 and 93 may be drilled into the spinner wall by any of several known drilling techniques such as laser drilling, electrical discharge milling (EDM), or electron beam drilling. As best shown in FIGS. 5 and 6, passages 92 and 93 are preferably drilled at an angle of from about 20 to about 45 from normal to the spinner peripheral wall. Depending upon the angle chosen, passages 92 and 93 may form a V-shape as shown in FIG. 5, or a Y-shape as shown in FIG. 6.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

We claim:

1. Apparatus for making dual component fibers comprising:
   a) a spinner having a peripheral wall with an interior surface and an exterior surface, and further including orifices located in said peripheral wall for centrifuging dual component fibers, said spinner being divided into a series of compartments by baffles positioned interiorly of said peripheral wall;
   b) equipment for supplying first and second molten thermoplastic materials to said spinner;
   c) a divider for directing said first molten thermoplastic material into alternate ones of said compartments and for directing said second molten thermoplastic material into the remaining ones of said compartments; and
   d) bores extending from said compartments through said peripheral wall and communicating with said orifices such that said molten thermoplastic materials flow through said bores to said orifices in said peripheral wall of said spinner, wherein pairs of adjacent ones of said bores extend from adjacent ones of said compartments such that adjacent bores of each pair are angled relative to one another to communicate with one another and with one of said orifices.

2. An apparatus as claimed in claim 1 in which adjacent ones of said bores extending from adjacent compartments join together in a V-shape.

3. An apparatus as claimed in claim 1 in which adjacent ones of said bores extending from adjacent compartments join together in a Y-shape.

4. An apparatus as claimed in claim 1 in which adjacent ones of said bores extending from adjacent compartments converge at an angle of from about 20 to 45.

5. An apparatus as claimed in claim 1 in which said bores have a diameter of from about 0.010 to about 0.040 inches.

6. An apparatus as claimed in claim 1 in which said bores are sized to provide a build up of said token thermoplastic materials in said compartments.

7. An apparatus as claimed in claim 1 in which said bores extending from adjacent compartments have substantially the same diameter and length.

8. An apparatus as claimed in claim 1 in which said divider includes a generally horizontal flange.

9. An apparatus as claimed in claim 8 in which said divider further includes a generally vertical interior wall, said interior wall including a series of orifices therein spaced to provide access for said first molten thermoplastic material into alternate ones of said compartments and to provide access for said second molten thermoplastic material into the remaining ones of said compartments.

10. Apparatus for making dual glass fibers comprising:
    a) a spinner having a peripheral wall with an interior surface and an exterior surface, and further including orifices located in said peripheral wall for centrifuging dual glass fibers, said spinner being divided into a series of compartments by baffles positioned interiorly of said peripheral wall;
    b) equipment for supplying first and second molten glasses to said spinner;
    c) a divider for directing said first molten glass into alternate ones of said compartments and for directing said second molten glass into the remaining ones of said compartments; and
    d) bores extending from said compartments through said peripheral wall and communicating with said orifices such that said molten glasses flow through said bores to said orifices in said peripheral wall of said spinner, wherein pairs of adjacent ones of said bores extend from adjacent ones of said compartments such that adjacent bores of each pair are angled relative to one another to communicate with one another and with one of said orifices.

11. An apparatus as claimed in claim 10 in which adjacent ones of said bores extending from adjacent compartments join together in a V-shape.

12. An apparatus as claimed in claim 10 in which adjacent ones of said bores extending from adjacent compartments join together in a Y-shape.

13. An apparatus as claimed in claim 10 in which adjacent ones of said bores extending from adjacent compartments converge at an angle of from about 20 to 45.

14. An apparatus as claimed in claim 10 in which said bores have a diameter of from about 0.010 to about 0.040 inches.

15. An apparatus as claimed in claim 10 in which said bores are sized to provide a build up of said molten glasses in said compartments.

16. An apparatus as claimed in claim 10 in which said bores extending from adjacent compartments have substantially the same diameter and length.

17. An apparatus as claimed in claim 10 in which said divider includes a generally horizontal flange.

18. An apparatus as claimed in claim 17 in which said divider further includes a generally vertical interior wall, said interior wall including a series of orifices therein spaced to provide access for said first molten glass into alternate ones of said compartments and to provide access for said second molten glass into the remaining ones of said compartments.

19. Apparatus for making dual glass fibers comprising:
    a) a spinner having a peripheral wall with an interior surface and an exterior surface, and further including orifices located in said peripheral wall for centrifuging dual glass fibers, said spinner being divided into a series of compartments by baffles positioned interiorly of said peripheral wall;
    b) equipment for supplying first and second molten glasses to said spinner;
    c) a divider for directing said first molten glass into alternate ones of said compartments and for directing said second molten glass into the remaining ones of said compartments so that adjacent compartments contain different glasses, said divider including a generally horizontal flange positioned intermediate the spinner peripheral wall;

d) a generally vertical interior wall, said interior wall including a series of orifices therein spaced to provide access for said first molten glass into alternate ones of said compartments and to provide access for said second molten glass into the remaining ones of said compartments; and e) bores extending from said compartments through said peripheral wail and communicating with said orifices such that said molten glasses flow through said bores to said orifices in said peripheral wall of said spinner, wherein pairs of adjacent ones of said bores extend from adjacent ones of said compartments such that adjacent bores of each pair are angled relative to one another to communicate with one another and with one of said orifices.

* * * * *

UNITED STATES PATENT AND TRADEMARK OFFICE
CERTIFICATE OF CORRECTION

PATENT NO. : 5,618,328

DATED : April 8, 1997

INVENTOR(S) : David C.K. Lin et al.

It is certified that error appears in the above-indentified patent and that said Letters Patent is hereby corrected as shown below:

In Claim 6, Line 2, "token" should be -- molten --.

Signed and Sealed this

Eighth Day of July, 1997

Attest:

BRUCE LEHMAN

Attesting Officer

Commissioner of Patents and Trademarks